United States Patent [19]

Bridgeford

[11] Patent Number: 4,762,564

[45] Date of Patent: Aug. 9, 1988

[54] REINFORCED CELLULOSE AMINOMETHANATE

[75] Inventor: Douglas J. Bridgeford, Champaign, Ill.

[73] Assignee: Teepak, Inc., Oak Brook, Ill.

[21] Appl. No.: 25,317

[22] Filed: Mar. 13, 1987

[51] Int. Cl.$^4$ .............................................. C08L 1/00
[52] U.S. Cl. .................................... 106/204; 106/165; 106/166; 106/163.1; 264/187; 428/289; 428/290; 428/535
[58] Field of Search ............... 106/163, 165, 166, 204; 536/30; 264/187; 428/289, 290, 535

[56] References Cited

U.S. PATENT DOCUMENTS

| | | | |
|---|---|---|---|
| 1,822,416 | 9/1931 | Nonamaker | 106/166 |
| 2,129,708 | 9/1938 | Schreiber | |
| 2,134,825 | 11/1938 | Hill et al. | |
| 3,454,982 | 7/1969 | Arnold | 17/42 |
| 3,456,286 | 7/1964 | Martinek | 17/49 |
| 3,833,021 | 9/1974 | Rose et al. | 106/166 |
| 4,390,490 | 6/1983 | Martinek et al. | 264/173 |
| 4,404,369 | 9/1983 | Huttunen et al. | 536/30 |
| 4,526,620 | 2/1985 | Selin et al. | 106/203 |
| 4,530,999 | 7/1985 | Selin et al. | 536/30 |
| 4,583,984 | 4/1986 | Turunen et al. | 264/187 |

FOREIGN PATENT DOCUMENTS 0178292  4/1986  European Pat. Off. .

*Primary Examiner*—Theodore Morris
*Attorney, Agent, or Firm*—Michael L. Dunn

[57] ABSTRACT

A reinforced article comprising cellulose aminomethanate containing a reinforcing fiber, wherein 0.5 to 30 numerical percent of the cellulose hydroxy groups have been substituted with aminomethanate groups.

11 Claims, No Drawings

REINFORCED CELLULOSE AMINOMETHANATE

BACKGROUND OF THE INVENTION

(a) Field of the Invention

This invention relates to cellulose based products and more particularly relates to viscose type products which can be formed into various products such as films and fibers.

(b) History of the Prior Art

The use of viscose has been used for an extended period of time in the manufacture of cellophane films, rayon fibers and other regenerated cellulose products. The viscose, dissolved modified cellulose, which has been commercially used in the prior art has almost universally been formed by treating cellulose with caustic soda and carbon disulfide to form cellulose xanthate which is then dissolved in weak caustic solution to form the viscose. The products formed from cellulose regenerated from this viscose have found great commercial success. Unfortunately, the carbon disulfide used in the process and by-product carbon disulfide and hydrogen sulfide from the process are extremely toxic and these products must be carefully managed.

A viable alternate to the traditional viscose process would therefore be desirable.

As early as 1930 (U.S. Pat. No. 1,771,461) it was proposed that ammonia derivatives of carbon dioxide such as urea, could be reacted with cellulose to form soluble products which could subsequently be used for the manufacture of fibers and films. This process was further discussed in U.S. Pat. Nos. 2,129,708 (1938) and 2,134,825 (1938) assigned on their faces to E. I. du Pont. The viscose type products resulting from this process are esters which will be referred to herein as cellulose aminomethanates, although they may also be known as cellulose aminoformates or cellulose carbamates in other references.

While the resulting final products, e.g. fibers and films, at least when made on a small scale, had fair properties, the properties, especially purity, strength and solubility at comparable chain lengths, were not nearly as good as similar products made from conventional viscose, i.e. the xanthate process. Recently, in part due to increased awareness of our environment, interest has again been shown in the alternate viscose technology disclosed in the above early references. It has, for example, been disclosed in U.S. Pat. No. 4,404,369 issued in 1983, that an alkali-soluble cellulose derivative could be produced by treating cellulose with liquid ammonia having urea dissolved therein. The object was to develop a product having urea distributed through the product prior to reaction by heating. The process described nevertheless has problems in that liquid ammonia also must be contained and in addition the product still did not have properties as good as desired.

Various proposals have been for increasing solubility of the cellulose aminomethanate product, e.g. U.S. Pat. No. 4,526,620 wherein excess urea is used to increase solubility but simultaneously creates urea contamination and U.S. Pat. No. 4,530,999 where the chain length is reduced by radiation which unfortunately also decreases end product strength.

It was proposed in European Patent Publication No. 178,292 published Apr. 16, 1986, that an improved product could be obtained when the alkali-urea impregnated cellulose was washed with urea solution to remove hydroxide prior to heating to form the ester. While this provided some improvement in the properties of the resulting ester, uniformity and thus strength especially when large quantities of products were made, are still not as good as desired to permit substitution for most xanthate type viscose in most commercial applications.

BRIEF DESCRIPTION OF THE INVENTION

It has now been discovered that when cellulose aminomethanate, similar to such materials of the prior art, is reinforced with fibers, the resulting product has strength which is comparable to prior art fiber reinforced products manufactured from cellulose xanthate type viscose. This is especially surprising since unreinforced films made from the cellulose aminomethanate type of viscose are in general not as strong as similar films made from cellulose xanthate type viscose.

In particular, the invention therefore comprises a reinforced article comprising cellulose aminomethanate containing a reinforcing fiber. The preferred cellulose aminomethanate has 0.5 to 30 and preferably 2 to 15 numerical percent of the cellulose hydroxy groups substituted with aminomethanate groups. The average degree of polymerization is from 450 to 650 combined glucose units. The article is usually a film or a fiber. When the article is a film the reinforcement usually comprises a fiber mat, usually a cellulose paper mat. When the article is a fiber, it usually has a diameter of at least ten times the diameter of the reinforcing fiber.

DETAILED DESCRIPTION OF THE INVENTION

Cellulose which is aminomethanated in accordance with the present invention may be represented by the formula:

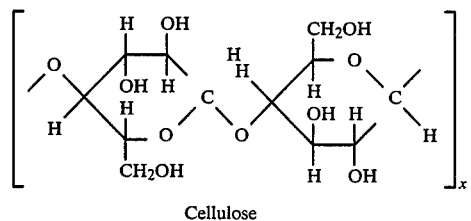

Cellulose

One half of this formula, i.e.

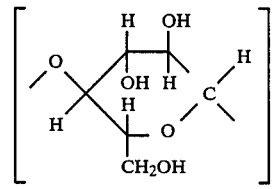

whether a dehydro derivative or whether or not it is substituted at an —OH position is referred to herein as a glucose unit. The average degree of polymerization of a cellulose (DP), whether or not it is aminomethanated at a hydroxy position, is the verage number of combined glucose units. The preferred average degree of polymerization is from 300 to 650. The average degree of polymerization can be expressed as $DP_W$ which is the weight average DP or by $DP_V$ which is determined by calculation from a viscosity determination and correlates with $DP_W$.

The cellulose aminomethanate is formed by reaction of cellulose with certain amine oxygen containing compounds such as urea or biuret.

It is believed that the cellulose is aminomethanated in accordance with the basic formula:

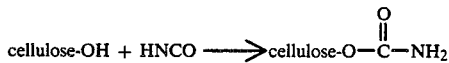

The isocyanic acid is believed to be generated at the time of reaction from urea or cyanuric acid or a similar compound, e.g.

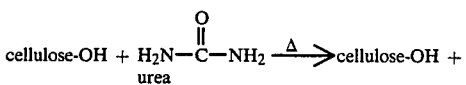

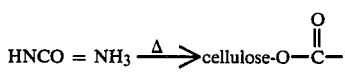

The urea may be carried into the cellulose structure by a suitable carrier such as liquid ammonia to more uniformly distribute the urea throughout the cellulose structure, as for example is described in U.S. Pat. No. 4,404,369.

The polymeric cellulose aminomethanate utilized in accordance with the invention to form the reinforced article desirably has from 0.5 to 30 numerical percent of the cellulose hydroxy groups substituted with aminomethanate groups and preferably has from 2 to 15 numerical percent of the cellulose hydroxy groups substituted. Prior to formation of the reinforced article, the polymeric cellulose aminomethanate desirably contains from about 3 to 30 numerical percent and preferably from about 5 to about 20 numerical percent of the cellulose hydroxy groups substituted with aminomethanate groups.

This structure permits the cellulose aminomethanate to be dissolved and handled in a manner similar to traditional viscose. The cellulose aminomethanate may then be extruded by known means to form a fiber reinforced article and coagulated in a manner similar to tradiational viscose coagulation. The coagulated aminomethanate film may be regenerated with a hot dilute concentration of sodium hydroxide.

More particularly, the cellulose aminomethanate having at least 3 numerical percent of the cellulose hydroxy group substituted and preferably at least 5 numerical percent of the cellulose hydroxy groups substituted may be dissolved in from about 6 to 10 percent sodium hydroxide solution at about $-5°$ C. The quantity of cellulose aminomethanate which can be dissolved in such a solution depends largely upon the average degree of polymerization of the cellulose and upon the degree of substitution (DS) of the hydroxy groups with aminomethanate groups as well as upon temperature. Desirably, from 6 to 10 percent of the polymeric cellulose aminomethanate can be dissolved by slurrying into a 6 to 10 percent sodium hydroxide solution at 15° C. followed by cooling to subzero temperatures, e.g. less than about $-4°$ C. The reduced temperature will cause the cellulose aminomethanate to dissolve. After solution the temperature may again be permitted to rise up to 10° C. or higher.

The aminomethanate may be coagulated in baths similar to the baths used to coagulate traditional xanthate viscose. The bath may, for example, contain a mixture of sodium sulphate and sulfuric acid. An example of such a bath might contain from about 200 to 300 grams per liter of sodium sulphate and from about 100 to 200 grams per liter of sulfuric acid. After coagulation, the article is neutralized with acid.

Very surprisingly, the aminomethanate viscose after coagulation and washing retains a low percentage of water in the primary gel when compared with other ether-type modified cellulose compositions. The quantity of water retained is very surprisingly similar to the quantity of water retained by traditional xanthate viscose after coagulation. The quantity of water contained may be as low as from between about 300 to about 500 percent water by weight of cellulose aminomethanate which is significantly lower than other coagulated ether type or ester type derivatives of cellulose. "Primary gel" as used herein means the coagulated and washed cellulose aminomethanate prior to initial drying.

The article may then be dried and if desired, regenerated in a dilute caustic soda solution, e.g. 1-2 percent NaOH at from 80° to 100° C. for from about 5 to about 20 minutes. Such a finished regenerated reinforced article may contain as few as 0.5 numerical percent or less of the cellulose hydroxy groups substituted with aminomethanate groups.

It has further been unexpectedly found that a reinforced article can be formed from cellulose aminomethanate polymer, as previously described, which has characteristics comparable to fiber reinforced xanthate viscose articles, especially films.

The reinforcing fiber may be any suitable fiber such as fibers made from organic polymers and even inorganic fibers such as fiberglass. In general, however, it is often desirable that the fiber be physiologically compatible for food packaging use and is therefore most usually a cellulose fiber both for reasons of physiological compatability and cost. The fibers may be blended with the cellulose aminomethanate polymer prior to formation of the article, e.g. a sausage casing or alternatively and preferably the cellulose aminomethanate may be extruded into a fiber web which is being formed into an article, e.g. a reinforced film. The fiber web may be either a felted or woven type web. In general, the web is a cellulose fiber paper and the casing comprises such a paper impregnated with said cellulose aminomethanate.

The methods for impregnating such a paper are well known to those skilled in the art and in general follow the procedures previously used for cellulose xanthate type viscose. A description of such procedures may be found, for example, in U.S. Pat. No. 4,390,490.

The cellulose aminomethanate polymer fiber reinforced articles of the present invention can be handled and packaged in a manner similar to traditional xanthate viscose fiber reinforced products. Such products can, for example, be provided as reelstock or can be folded, e.g. shirred and sold accordingly. Methods for forming shirred sausage casings in this form are well known to those skilled in the art as, for example, is taught in U.S. Pat. Nos. 3,454,982 and 3,456,286.

The following examples serve to illustrate and not limit the present invention.

Various cellulose aminomethanates were prepared substantially in accordance with the teachings of U.S. Pat. No. 4,404,369. Cellulose pulp was saturated with urea dissolved in liquid ammonia, the ammonia was evaporated and the fibers containing 50 to 100% urea on the fiber weight were heated to 165° to 175° C. for periods of one to three hours. The resulting product was then extracted with hot water to remove excess urea and biuret to obtain 0.06 to 0.25 DS cellulose aminomethanate which will readily dissolve in 8 to 10%, −5° C. sodium hydroxide. DS as used in these examples means the number of —OH groups substituted per glucose unit divided by three (available —OH groups). Numerous such preparations were made.

EXAMPLE I

A 699 DP cellulose pulp aged as alkali treated cellulose crumb 16 hours at 28° C. was used. 60 grams of the pulp was steeped in a solution of 60 grams of urea in liquid ammonia at −40° C. for 2 hours near the boiling point of the liquid ammonia. The excess is pressed from the steeped pulp and the treated pulp is tumbled for 15 minutes. Excess ammonia is allowed to evaporate for 18 hours. The resulting product is found to have a 58% urea added on. 50 grams of the product is cured and heated to between 185° and 190° C. for 15 minutes.

A 5% dope is dissolved in 8% caustic at −5° C. to 6° C. The product is then centrifuged for 2 hours. A paper web is then impregnated with the liquid product and the product is coagulated as previously described. The impregnated web is then dried at 100°–105° C. for 10 minutes. The reinforced product is found to have properties similar to the fiber reinforced xanthate viscose products traditionally used in the prior art.

EXAMPLE II

A high quality 96.5% alpha content 635 $DP_W$ dissolving wood pulp was used as starting material.

A batch of 450 g of the dissolving pulp was fluffed to make it more accessible, was added to 5.8 liters of liquid ammonia plus 214 g of urea contained in Dewar flask at approximately −40° C. The fluffed material was compressed periodically during the 2 hours steep and manually squeezed and drained to remove 705 g of 950 ml of the liquid ammonia solution.

The batch was then placed in a rotating polyethylene drum of about 20" diameter for tumbling during the evaporation of the liquid ammonia. The tumbling required about 3 hours to get to a 624 g net weight for the resulting urea-impregnated cellulose which then contained approximately 38% addon to the cellulose. The material had 6% volatiles defined as that which is volatile at 110° C. for 3 hours drying time for the sample.

The above and similar batches were accumulated to do a large scale curing of this low addon, low DP cellulose material to form a low DP cellulose aminomethanate suitable for use as an impregnating liquid for a hemp fiber reinforced film.

The resulting 1160 g of the urea impregnated cellulose, containing 35–36% urea addon, were placed in stainless steel trays in approximately a 5 cm thick layer at a pack density of about 0.12 per cc. A thermo-couple was inserted into the midpoint of the thickness of one of the trays and the tray placed in a large laboratory oven for cure. The trays were placed in the oven initially set at about 130° C. and the oven went to about 110° C. as the trays were placed in it. The oven temperature was then rapidly raised while the temperature of the midpoint of the probe in the pad was followed and the oven raised at a level to permit no higher than 40° C. differential in temperature between the oven and midpad temperature for any midpad temperature in excess of 120° C. A midpad temperature of 120°–158° C. the average temperature differential was 40° C. The total cure time was 43 minutes for the batch. The batch was then removed and exhibited a light tan color which was uniform throughout the thickness of the 5 cm pads.

The resulting aminomethanate was washed in hot water to remove by-product materials and dried at low temperature to approximately 3% moisture. Approximately 845 g of pure cellulose aminomethanate with a nitrogen content of 1.24% resulted. This material when dissolved in 8% caustic at 8% polymer concentration showed a ball fall of viscosity of approximately 17 seconds. This viscosity is suitable for a dope to be used in impregnation of a reinforcing web to make reinforced casing material. The 7% dope centrifuged at 2700 rpm for 1 hour showed no obvious residue of fibrous at the bottom and was air free from the centrifuging process.

An 8 Kg batch of 7% aminomethanate solution was made in 8% sodium hydroxide using a jacketed planetary laboratory mixer. The aminomethanate was added to the port of the mixer which had in it a mix of 4932 g ice and 2480 g of 25% cooled sodium hydroxide solution. The temperature of the dispersion of aminomethanate was initially −6° C. The mixing was continued near full speed for about 1½ hours with the temperature allowed to rise gradually to 0° C. The dope was then filtered at 50 psi through a 100 micron filter. A yield of about 7.2 k of filtered dope was obtained, the remainder being the mechanical loss in the pressure feeding device and in the void space of the filter casing.

The resulting filtered dope was placed in a 4° C. refrigerator and the dope was drawndown with 30 mil drawdown and 22 mil drawdown blades for the manufacture of abaca web reinforced films.

At 20° C. the material was drawn down on a glass plate and a 12½ basis weight abaca web was immediately placed on the drawdown liquid and allowed to saturate with the liquid for 1 minute. The web was rapidly saturated with the aminomethanate dope and the resulting plate and attached film was then placed in a modified fibrous casing coagulating bath for 10 minutes at 20° C. This was enough time for coagulation and neutralization for the caustic in the bath. The resulting reinforced cellulose aminomethanate films were then washed in hot tap water until free of acid. The coagulation liquid contained about 8% ammonium sulfate, about 12% sodium sulfate and 6% sulfuric acid. The resulting reinforced gel films were dried on hoops for 10 minutes at 135° C.

The product showed a rewet tensile strength of 3144 psi and an elongation at break of 69% at 30 mil and 3038 psi tensile and 59.8% elongation at 22 mil.

EXAMPLE III

A pilot run was made using approximately 12 gallons of 6% cellulose aminomethanate dope that had been filtered through a 60 micron 200 in² filter and had also been desired. The size 1 casing run was done at normal commercial running rate of 30 ft per minute.

The 12 gallons were made up of 5 separate aminomethanate preparations which were slightly different in composition and DP. These are described as follows:

The first 4.5 gallon bath, 6% aminomethanate dope was made from an aminomethanate synthesized from $DP_W$ 660, 93.4 α, dissolving pulp (Buckeye V-65) that had been steeped in dilute urea solution and liquid ammonia for 2 hours to build a 45% load of urea based on the weight of the cellulose. The steeping was done at 1:10 ratio, excess liquid poured off, the pulp fluff slightly squeezed, and then tumbled for about 2½ hours in a horizontal tumbling device with a 2 psi air flow through the sparging device to aid in evaporation of ammonia at near or below room temperature. The resulting white fluffy material was then converted to the cellulose aminomethanate by use of 2-3 cm layers of the compacted material placed in stainless steel trays and cured in a laboratory vacuum oven.

The oven was set at 156° C. and the stainless steel trays with the urea cellulose pads were introduced which dropped the temperature to 130° C. Curing was continued at 23" mercury vacuum from an aspirator with a small air stream flowing through the oven both to sweep ammonia away and to aid in heat transfer. The curing was continued for 2½ hours with the air temperature near 155° C. for 2 hours of that period. The resulting cured crude cellulose aminomethanate was light tan in color and was washed in hot water extensively to remove by products and dried at low temperature to avoid hornification, i.e. undesirable film surface densification.

A 7% solution in −5° C., 8% sodium hydroxide was a fairly dark brown, very clear solution. It was thus judged that this material would be suitable for the matrix in the fibrous casing run.

For dissolving, a jacketed insulated planetary mixing device of 4 gallons capacity was used with 900 g of pulp prewet with ice water prior to introduction into the mixer. The requisite amount of water in the form of ice, and sodium hydroxide in the form of 25% sodium hydroxide were previously introduced into the mixer and the mixer cooled to about −6° C. The ice water wet-pulp with the appropriate adjustment to give a 6% final polymer solution was introduced through a port and mixing continued at −5° to −2° C. for 2½ hours. The dope was deaired by application of a vacuum for the last hour of the dissolution. A clear viscous dope resulted which could be filtered through about a 210 square inch, 60 micron filter with approximately 1 hour required for filtration of the total batch.

The filtered and deaired, dope was maintained at approximately 0° C. for the succeeding day.

A second 4 gallon batch of 6% cellulose aminomethanate dope was made from a aminomethanate derived from about ⅔ of the 900 g of V-65 Buckeye pulp and ⅓ $DP_W$ 855-930, 94.6% α dissolving pulp (Buckeye V-60). The cellulose aminomethanate was synthesized in a vacuum oven starting out at about 10° C. more than the previous batch and with reaction time of 2½ hours. The material was washed and dried at low temperature prior to dissolution in the jacketed ross planetary mixer.

In this dissolution, the 900 g of bone dry aminomethanate was presoaked in 3600 g of ice water for ½ hour. The mixture of ice and sodium hydroxide in the mixer was set initially at −8° C. before addition of the cold wet aminomethanate. The mixer was operated at top speed of about 160 rpm for 2 hours and the contents observed to contain some particles. An additional one hour resulted in no particles at a temperature of 2° C. The batch appeared to be less viscous than the first batch and better quality. A 60 micron filter with approximately 210 square inch filter area was used for filtration. The filtration was accomplished after a one hour deairation of the batch during this dissolution process. The resulting filtered and deaired dope was retained for admixture with the remainder of the dope for the pilot run.

A third batch was made of 6% cellulose aminomethanate dope. In this case a mix of ⅓ Buckeye V-60 derived aminomethanate and ⅔ $DP_W$ 635, 95.5 α dissolving pulp (Buckeye V-68) derived aminomethanate was used. The aminomethanate had been made from cellulose with a load of about 45% urea and the curing of the urea impregnated cellulose to convert to cellulose aminomethanate was done under atmospheric pressure rather than in a vacuum oven. The curing was done in a relatively low air flow rate laboratory oven.

The urea cellulose was loaded into stainless steel trays at about 5 cm thickness with a density of about 0.13 g per cc. The oven was initially set at 140° C. with the trays at room temperature introduced into the oven cooling it to 125° C. The oven was gradually programmed to increase the temperature as the temperature of a thermo-couple set midway down in the pad increased in temperature. For temperatures below 120° C. the temperature differential could be 70°-80° C. For temperatures above 120° C. the maximum temperature differential allowed was 60° C. The reaction was continued for a total of 75 minutes with the pad temperature at 162°-168° C. for the last 25 minutes.

The air temperature maximum was 200° C. and at 45 minute reaction time was reduced gradually to 170° C. to avoid continued escallation of the curing temperature. A very uniformly tan colored series of pads was gotten with a uniform color throughout the thickness of the 5 cm pad. The material was washed in hot city water at 50°-55° C., was pressed free of excess water and dried at 65°-70° C. to avoid hornification. This material was the starting material used in the preparation of the third batch of dope to be used in the pilot scale run.

The composited, filtered, deaired dopes had material with about a 1.4% nitrogen content based on the weight of the dry cellulose aminomethanate at the time it was introduced into a blow tank to feed the die of a fibrous casing pilot machine. The die used was a pressure-fed die wherein a 12½ pound basis weight per 2880 square feet abaca saturated tissue web was impregnated using a hydraulic wedge principle and an enclosed die which forced the liquid into the paper and did not depend on spontaneous capillarity to impregnate the web uniformly with the aminomethanate dope. The dope was fed to the machine at about 10° C. so was quite viscous.

The die was adjusted using a paper leader to avoid wastage of the very limited amount of cellulose aminomethanate dope. The coagulation bath was modified over that commonly used for cellulose fibrous casing and was run at 45° C.

The coagulation bath consisted of 142 g per liter sulfuric acid and 253 g per liter sodium sulfate initially. The pilot machine was run at 30 feet per minute and the time of contact of the extruded, impregnated paper with the coagulation bath was less than 10 seconds. It was noted during the start of the run that the cellulose aminomethanate 6% dope coagulated very rapidly, such that when the casing was pulled through the set of 8 wiper rods just above the coagulation tank, that no damage to the film seemed to occur. Some problems were encountered in making a ¼" lap seam initially, but subsequently casing was made wherein the seam held. The casing was washed with one tank past the regeneration tanks and with only three wash tanks prior to the normal position of the glycerine plasticizer tank. The casing was readily made to the flat width standards of 6.2 to 7.1 cm and part of it, approximately 200 feet, was passed through to the dryer. All the gel casing samples were retained so that links of the casing that had a good seam could be dried as 4 feet lengths in the laboratory high air velocity oven. The casing was almost colorless and it was noted that the fresh gel film just above the coagulation tank when soaked in water at about 1-10 liquor ratio had a pH of about 2.4. Clearly, even the 10 second coagulation time where the coagulation had access to both the inside and outside of the film, resulted in the neutralization of essentially all of the caustic in the 6% aminomethanate.

Since no gases were evolved, no problems in distortion of the gel casing during passage to the machine were noted. The osmotic water would be taken up, due to the salt in the film, but appeared to present no problems and a normal cut cycle was maintained during the approximately 45 minute production run. The resulting casing samples having a glycerol content to about 10% had a Mullen rewet of about 35 psi, whereas the gel had a Mullen of about 16 psi. This behavior was also fairly typical of hand cast aminomethanate fiber paper-reinforced films.

The casing had a bone dry gauge of approximately 85 g per 10 meters, which is somewhat lower than the 94 g per 10 meters that would be typical of a size 1 cellulose based casing. However, the cellulose based casing would be made with 7.7% cellulose xanthate viscose, compared with 6% cellulose aminomethanate dope employed in the current pilot run.

The cellulose aminomethanate in the matrix casing expressed on a dry basis had a nitrogen content of 0.7% at th dry end of the dryer. This represents loss of 50% of the initial nitrogen content in the mixed dope batched during the first day storage and the handling of the dope at the casing process machine.

The loss in aminomethanate during storage and prior to extrusion is probably good because this reduces the alkali swellability of the film and thus gives a stronger film.

A sample of casing retained in the gel state after the pilot run showed a gel 16 psi average Mullen test; whereas the rewet casing showed a 31 psi Mullen. The somewhat lower Mullen strength than that for standard size 1 commercial xanthate viscose fibrous casing can be attributed to the lower bone dry gauge of this casing relative to commercial xanthate viscose size 1 casing.

A meat emulsion representing a commercially made meat material was used to stuff the size 1 casing to a circumference of 6" which is standard for this size casing. The cooking was done in a laboratory style oven with no RH control. The oven was initially set at 75° C. and the bolognas cooked for 135 minutes to internal temperature of 73° C. The cooked sausage looked normal.

To further test the casing, a length of casing was hand shirred on a mandrel without casing damage.

What is claimed is:

1. A reinforced article comprising cellulose aminomethanate containing a reinforcing fiber, wherein 0.5 to 30 numerical percent of the cellulose hydroxy groups have been substituted with aminomethanate groups.

2. The article of claim 1 wherein the article is a film.

3. The article of claim 1 wherein the article is a fiber.

4. The film of claim 2 wherein from 5 to 15 numerical percent of the cellulose hydroxy groups have been substituted with aminomethanate groups.

5. The film of claim 2 wherein the average degree of polymerization is from 450 to 650 combined glucose units.

6. The film of claim 2 wherein the cellulose has been at least partially regenerated.

7. The fiber article of claim 3 wherein the fiber article has a diameter of at least 10 times that of the reinforcing fiber.

8. The fiber of claim 3 wherein from 5 to 15 numerical percent of the cellulose hydroxy groups have been substituted with aminomethanate groups.

9. The fiber of claim 3 wherein the average degree of polymerization is from 450 to 650 combined substituted and unsubstituted anhydrous glucose units.

10. The film of claim 2 wherein the film comprises a fiber mat impregnated with the cellulose aminomethanate.

11. The film of claim 10 wherein the fiber mat is a cellulose fiber paper.

* * * * *

REEXAMINATION CERTIFICATE (1889th)
United States Patent [19]
Bridgeford

[11] B1 4,762,564
[45] Certificate Issued Dec. 29, 1992

[54] REINFORCED CELLULOSE AMINOMETHANATE

[75] Inventor: Douglas J. Bridgeford, Champaign, Ill.

[73] Assignee: Teepak Inc., Oak Brook, Ill.

Reexamination Request:
No. 90/002,146, Sep. 25, 1990

Reexamination Certificate for:
Patent No.: 4,762,564
Issued: Aug. 9, 1988
Appl. No.: 25,317
Filed: Mar. 13, 1987

[51] Int. Cl.[5] .......................... C08L 1/00; C08L 1/08
[52] U.S. Cl. .................................. 106/204; 106/163.1; 106/165; 106/166; 264/187; 428/289; 428/290; 428/535

[58] Field of Search ................. 106/163.1, 165, 166, 106/204; 428/289, 290, 535; 536/30; 264/187

[56] References Cited
U.S. PATENT DOCUMENTS

| | | |
|---|---|---|
| 1,822,416 | 9/1931 | Nonamaker . |
| 2,129,708 | 9/1938 | Schreiber . |
| 2,134,825 | 11/1938 | Hill et al. . |
| 3,833,021 | 9/1974 | Rose et al. . |
| 4,404,369 | 9/1983 | Huttunen et al. . |
| 4,486,585 | 12/1984 | Turunen et al. . |
| 4,530,999 | 7/1985 | Selin et al. . |
| 4,583,984 | 4/1986 | Turunen et al. . |

*Primary Examiner*—Theodore Morris

[57] ABSTRACT

A reinforced article comprising cellulose aminomethanate containing a reinforcing fiber, wherein 0.5 to 30 numerical percent of the cellulose hydroxy groups have been substituted with aminomethanate groups.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-11 are cancelled.

* * * * *